United States Patent
Hufferd et al.

(10) Patent No.: US 7,526,574 B2
(45) Date of Patent: Apr. 28, 2009

(54) METHOD FOR COMMUNICATING DATA TRANSFER REQUESTS BETWEEN DATA TRANSFER PROTOCOLS

(75) Inventors: John Lewis Hufferd, San Jose, CA (US); Michael Anthony Ko, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 849 days.

(21) Appl. No.: 10/830,476

(22) Filed: Apr. 21, 2004

(65) Prior Publication Data

US 2005/0240678 A1    Oct. 27, 2005

(51) Int. Cl.
G06F 15/16       (2006.01)
G06F 15/173      (2006.01)
G06F 15/177      (2006.01)

(52) U.S. Cl. .................. 709/246; 709/217; 710/22
(58) Field of Classification Search .................. 709/246, 709/240–245, 247–248, 217–224; 710/22
See application file for complete search history.

(56) References Cited

U.S. PATENT DOCUMENTS

| | | | |
|---|---|---|---|
| 5,495,614 A | 2/1996 | Brent et al. | |
| 6,032,224 A | 2/2000 | Blumenau | |
| 6,360,282 B1 | 3/2002 | Langerman et al. | |
| 6,374,248 B1 | 4/2002 | Nazari | |
| 6,983,303 B2 * | 1/2006 | Pellegrino et al. | 709/203 |
| 7,043,578 B2 | 5/2006 | Hufferd | |
| 7,089,293 B2 * | 8/2006 | Grosner et al. | 709/217 |
| 7,299,266 B2 * | 11/2007 | Boyd et al. | 709/213 |
| 2002/0029281 A1 | 3/2002 | Zeidner et al. | |
| 2002/0059309 A1 | 5/2002 | Loy et al. | |
| 2002/0059451 A1 | 5/2002 | Haviv | |
| 2002/0095547 A1 | 7/2002 | Watanabe et al. | |
| 2002/0124137 A1 | 9/2002 | Ulrich et al. | |
| 2003/0014544 A1 | 1/2003 | Pettey | |
| 2003/0041211 A1 | 2/2003 | Merkey et al. | |
| 2003/0046396 A1 | 3/2003 | Richter et al. | |
| 2003/0058870 A1 | 3/2003 | Mizrachi et al. | |
| 2003/0061402 A1 | 3/2003 | Yadav | |

(Continued)

OTHER PUBLICATIONS

Recio, R., "*RDMA enabled NIC (RNIC) Verbs Overview*," pp. 1-28, dated Apr. 29, 2003. Available from http://www. rdmaconsortium/home/RNIC-Verbs_Overview2.pdf.

(Continued)

*Primary Examiner*—Haresh N Patel
(74) *Attorney, Agent, or Firm*—David Victor; Konrad Raynes & Victor LLP

(57) ABSTRACT

Provided are a method, system, and program for communicating data transfer requests between data transfer protocols. A request is received conforming to a first data transfer protocol at an initiator node to transmit to a target node, wherein the request includes a request identifier in the first data transfer protocol. A reference is obtained to a memory location to use for the request using a second data transfer protocol, wherein the reference is used by the second data transfer protocol. An entry is added to a map associating the reference to the memory location for the second data transfer protocol with the request identifier for the first data transfer protocol. The second data transfer protocol is used to transfer the request with the request identifier and the reference to the memory location.

7 Claims, 8 Drawing Sheets

U.S. PATENT DOCUMENTS

| | | |
|---|---|---|
| 2003/0067913 A1 | 4/2003 | Georgiou et al. |
| 2003/0070043 A1 | 4/2003 | Merkey |
| 2003/0084209 A1 | 5/2003 | Chadalapaka |
| 2003/0084243 A1 | 5/2003 | Hoshina et al. |
| 2003/0099254 A1 | 5/2003 | Richter |
| 2003/0101239 A1 | 5/2003 | Ishizaki |
| 2003/0131228 A1 | 7/2003 | Tworney |
| 2003/0135514 A1 | 7/2003 | Patel et al. |
| 2003/0135692 A1 | 7/2003 | Noya et al. |
| 2003/0165160 A1 | 9/2003 | Minami et al. |
| 2003/0169690 A1 | 9/2003 | Mott |
| 2003/0172169 A1 | 9/2003 | Cheng |
| 2004/0034725 A1* | 2/2004 | Elzur ................ 710/22 |
| 2004/0073622 A1* | 4/2004 | McDaniel et al. ........ 709/212 |
| 2005/0198062 A1* | 9/2005 | Shapiro ................ 707/102 |
| 2005/0240941 A1 | 10/2005 | Hufferd et al. |
| 2006/0067346 A1* | 3/2006 | Tucker et al. ............ 370/412 |

OTHER PUBLICATIONS

Shah, H. J. Pinkerton, R. Recio and P. Culley, "Direct Data Placement Over Reliable Transports (Version 1.0) draftshah-iwarp-ddp-v1.0)," pp. 1-35. Release Specification of the RDMA consortium. Available at http://www.rdmaconsortium.org, Oct. 31, 2002.

Ko, M., M. Chadalapaka, U. Elzur, H. Shah and P. Thaler. iSCSI Extensions for RDMA Specification (Version 1.0) (draft-ko-iwarp-iser-v 1.0), pp. 1-76. Release Specification of the RDMA Consortium. Available at http://www.rdmaconsortium.org, Jul. 31, 2003.

Culley, P. U. Elzur, R. Recio, S. Bailey, et al. "Maker PDU Aligned Framing for TCP Specification (Version 1.0) (draft-culley-iwrap-mpa-v 1.0)," pp. 1-32. Release Specification of the RDMA Consortium. Available at http://www.rdmaconsortium.org, Oct. 25, 2002.

* cited by examiner

ITT/STag Mapping

METHOD FOR COMMUNICATING DATA TRANSFER REQUESTS BETWEEN DATA TRANSFER PROTOCOLS

BACKGROUND OF THE INVENTION

1. Field of the Invention

The present invention relates to a method, system, and program for communicating data transfer requests between data transfer protocols.

2. Description of the Related Art

In storage environments, data access commands are communicated from a host system to a storage controller, which manages access to the disks. The storage controller may be a card inside the host system or a separate device. The Internet Small Computer Systems Interface (iSCSI) protocol is used for storage networks that utilize Ethernet connections, including Ethernet switches and routers. The term "iSCSI" as used herein refers to the syntax and semantic of the iSCSI protocol defined by the IETF (Internet Engineering Task Force) standards body, and any variant of that protocol. In current storage networks where iSCSI is utilized, the packet configuration comprises an Ethernet package encapsulating an Internet Protocol (IP) and Transmission Control Protocol (TCP) package layers, which further encapsulate an iSCSI package that includes one or more SCSI commands. The Ethernet protocol provides for link-level error checking as the packets flow from point-to-point on any network segment (link) to determine whether data has been corrupted while passing on a link. In network data transmission operations, an initiator device transmits data or commands over the network to a target device. The TCP/IP package includes an error detection code to perform an end-to-end checking to determine at the opposite end whether the transmitted packet has changed during the transmission as the packet passes through switches and routers. A receiving device detecting an error will send a negative acknowledgment to the sending device to request retransmission of those packets in which errors were detected.

The Remote Direct Memory Access (RMDA) protocol provides the capability of one computer to directly place information in another computer's memory with minimal demands on memory bus bandwidth and processor overhead. RDMA over TCP/IP (also known as iWARP) defines the interoperable protocols to support RDMA operations over standard TCP/IP networks. An RDMA Network Interface Card (RNIC) network adaptor card implements the RDMA protocol and performs RDMA operations to transfer data to local and remote memories. Further details of the RDMA protocol are described in the specifications entitled "RDMA Protocol Verbs Specification (Version 1.0)", published by the RDMA Consortium (April, 2003); "Direct Data Placement over Reliable Transports (Version 1.0)", published by RDMA Consortium (October 2002); and "Marker PDU Aligned Framing for TCP Specification (Version 1.0)", published by the RDMA Consortium (October 2002), and which specifications are incorporated herein by reference in their entirety.

One specification entitled "iSCSI Extensions for RDMA Specification (Version 1.0), by Michael Ko et al., released by the RDMA Consortium (July, 2003), which specification is incorporated herein in its entirety, defines a protocol for providing the RDMA data transfer capabilities to iSCSI by layering iSCSI on top of RDMA.

Data transfer systems, including the RDMA and others described above, typically require the intervention of kernel mode processes to handle the read and write operations to and from the storage devices.

BRIEF DESCRIPTION OF THE DRAWINGS

Referring now to the drawings in which like reference numbers represent corresponding parts throughout.

SUMMARY

Provided are a method, system, and program for communicating data transfer requests between data transfer protocols A request is received conforming to a first data transfer protocol at an initiator node to transmit to a target node, wherein the request includes a request identifier in the first data transfer protocol. A reference is obtained to a memory location to use for the request using a second data transfer protocol, wherein the reference is used by the second data transfer protocol. An entry is added to a map associating the reference to the memory location for the second data transfer protocol with the request identifier for the first data transfer protocol. The second data transfer protocol is used to transfer the request with the request identifier and the reference to the memory location.

DETAILED DESCRIPTION

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
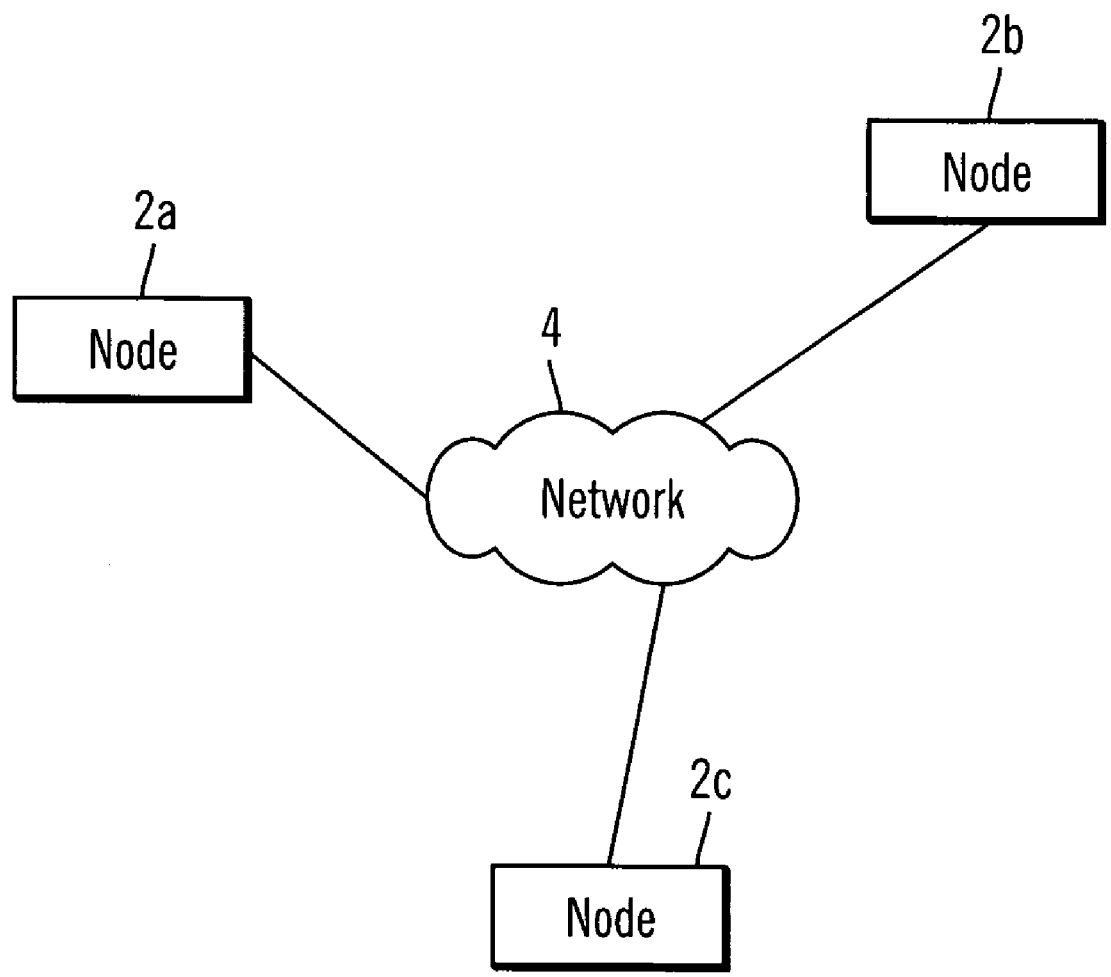
FIG. 1 illustrates an example of network nodes in which embodiments are implemented.

FIG. 1 illustrates a network computing environment comprised of a plurality of computing nodes 2a, 2b . . . 2n that communicate over a network 4. The network may comprise a Local Area Network (LAN), Wide Area Network (WAN), Storage Area Network (SAN). Alternatively, the nodes may communicate over a bus, such a SCSI bus, etc.

Figure 2:
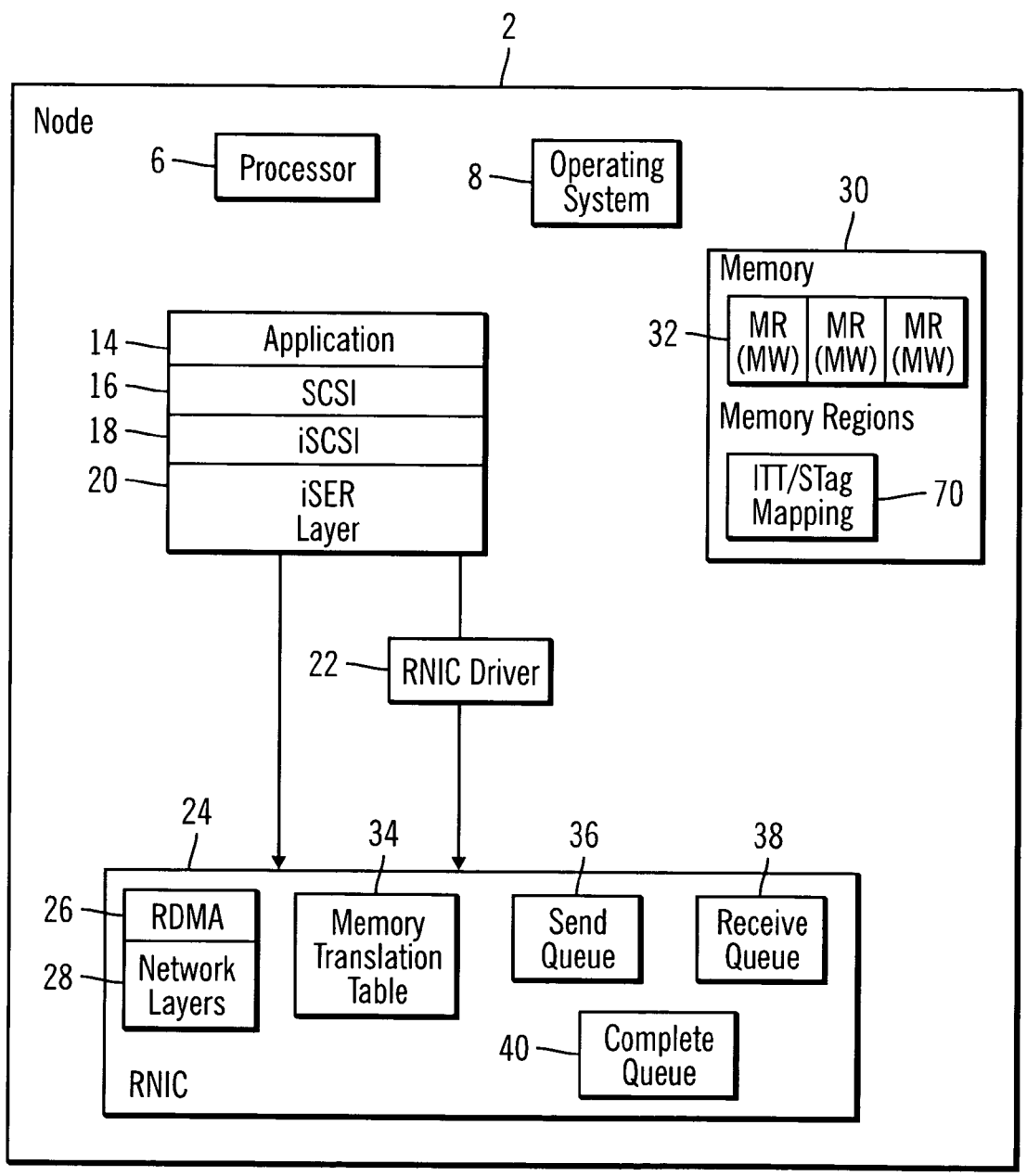
FIG. 2 illustrates an example of a computing architecture in accordance with the described embodiments.

The nodes 2a, 2b . . . 2n in FIG. 1 may operate as both initiators and targets. FIG. 2 illustrates components included in a node, such as nodes 2a, 2b, 2c, to enable communication over the network 4. A node 2 includes a processor 6, such as a central processing unit or complex, and an operating system 8. The operating system 8 provides a user address space and kernel address space, where user applications 14 execute in the user address space and essential operations execute in the kernel address space, such as resource allocation, low-level hardware interfaces, security, etc.

An application 14 comprises a user application, such as a database program, server program, etc. To perform an I/O operation, the application 14 would make a call (directly or indirectly) to a SCSI layer 16 to generate a SCSI I/O request, which in turn would make a call to an iSCSI layer 18, which in turn would call an iSER layer 20 to make calls to the RNIC 24. The iSER layer 20 may call the RNIC 24 directly through function calls or through the RNIC driver 22. The RNIC 24 includes an RDMA layer 26 and network layers 28, such as a TCP layer, IP layer, and Ethernet layer, to package a packet in the transport layer for transmission over the network 4 or unpackage packets received from the network 4.

In certain embodiments, to perform I/O operations, the iSER functions called to handle the I/O request need to register a memory location in memory 30 to use for the I/O operation. The registered memory locations may include memory regions and memory windows. The RNIC 24 may directly access the registered memory location (locally or locally and remotely) in a logically contiguous fashion. A defined memory location, such as a memory region or memory window, is identified by a steering tag ("STag") created by the RNIC 24 and used to reference the registered memory location, such as memory regions 32. In certain embodiments, a memory region or subset of a memory region referred to as a memory window may be registered, where a separate STag would be associated with each registered memory location (region or window). The RNIC 24 uses the STag to access the referenced memory location. In certain embodiments, the iSER layer 20 would call the RNIC 22 to register the memory regions by calling an RNIC driver 22. The RNIC driver 22 comprises the device driver to interface the operating system 8 with the RNIC adaptor 24. In response to the call from the function in the iSER library to declare and register a memory location, e.g., memory region or window, the RNIC driver 22 would call the RNIC 24. The RNIC Driver 22 (also sometimes called the "Verb" layer) along with the RDMA layer 26 in the RNIC 24 pins the memory location to register, such as memory regions (MRs) 32, and generates an STag for the memory region.

The RNIC 24 RDMA layer 26 maintains a memory translation table 34, and when registering a memory region, would add an entry to the memory translation table 34 identifying the registered memory region and the STag generated to reference that memory region to enable the RNIC 24 to associate the STag with the memory region. The memory translation table 34 may be maintained within buffers in the RNIC 24 or within the memory 30. The STags would be returned to the iSER functions requesting the registration to use for I/O operations.

After the RNIC 24 generates and returns STags to the iSER layer 20, the iSER layer 20 may proceed with the I/O operation. The iSER layer 20 would wrap the packet received from the iSCSI layer 18 with header information and the STag received from the RNIC 24 and pass the packet to the RNIC 24 to transfer. The iSER layer 20 functions that interface with the RNIC 24 to perform the RDMA data transfer operation may execute in the user address space, thereby bypassing the RNIC driver 22 executing in the kernel space.

To manage RDMA data transfers, the RNIC 24 maintains a send queue 36, a receive queue 38, and a complete queue 40. The send queue 36 and receive queue 38 comprise the work queues that the RNIC 24 uses to manage RDMA data transfer requests. The complete queue 40 may comprise a sharable queue containing one or more entries having completion entries to provide a single point of completion notification for multiple work queues. The queues 36, 38, and 40 may have many instances, perhaps for each logical connection, and may be allocated by the RNIC 24 in the memory 30 or within buffers in the RNIC 24.

Figure 3:
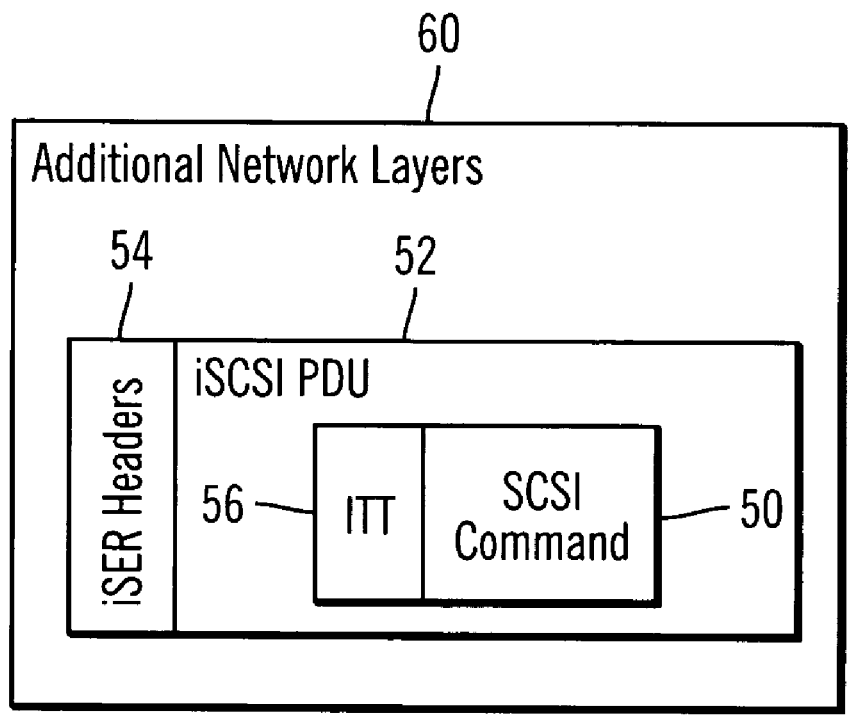
FIG. 3 illustrates a packet format.

FIG. 3 illustrates the format of a transmitted package used with the embodiments. A SCSI command 50 (such as a read or write command), which is generated by the SCSI layer 16, is encapsulated by the iSCSI layer 18 within an iSCSI protocol data unit (PDU) 52, which is further encapsulated by the functions in the iSER layer 20 within an iSER header 54. The iSCSI PDU 52 including a SCSI command further 50 includes an initiator task tag (ITT) 56, which the iSCSI layer 18 assigns to every issued iSCSI task, associated with an underlying SCSI command, to identify the underlying SCSI I/O operation. The ITT 56 uniquely identifies the task session wide. When the target node responds to a request from the initiator, the ITT is used to relate the response to the original request at the iSCSI layer 18. For instance, an ITT in the SCSI Response PDU from the target iSCSI layer 18, that is sent when the target has completed the operation and returns operational status, is used by the initiator iSCSI layer 18 to relate the target's PDU with the original SCSI write command.

The iSER header 54 would include STags used with the I/O operation and information indicating whether the remote node receiving the advertised STag is to read or write to the memory region (window) referenced by an STag and the work queues related to the request. The iSER header 54 and iSCSI PDU 52 are further encapsulated in one or more additional network layers 60, such as a TCP layer, IP layer, and/or Ethernet layer to allow transmission using these additional network protocols. In certain embodiments, the network layers 28 in the RNIC 24 would assemble the iSER header 54 and PDU 52 within the additional network layers 60, such as TCP, IP, Ethernet, etc.

Figure 4:
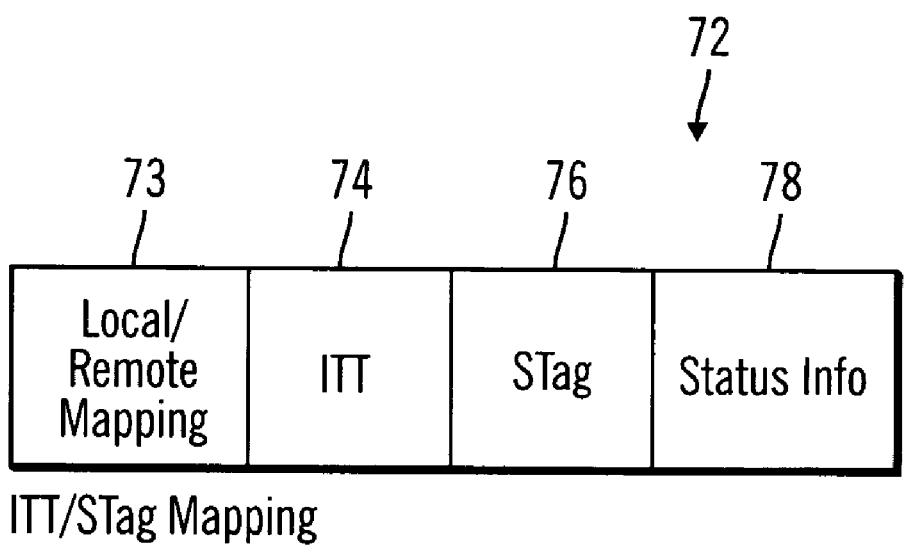
FIG. 4 illustrates information maintained on a mapping.

The iSER layer 18 further maintains an ITT/STag map 70 that associates an ITT representing an iSCSI task with an STag that is used to transfer the data for that task, such as a read or write STag to cause the target node to read or write data through the RDMA channel. FIG. 4 illustrates the content of an entry 72 in the map 70, including a local/remote indicator 73 indicating whether the mapping is for a local or remote STag. A local mapping entry associates an STag referencing a local memory window or region with an ITT that is used to store (or retrieve) data locally related to the I/O command and a remote mapping entry associates an STag referencing a memory region or window on a remote node with an ITT from which data is to be read or transferred to the local memory region or window. The mapping entry 72 further includes the associated ITT 74 representing the iSCSI task, an STag 76 associated with that task, and status information 78 on the task.

Figure 5:
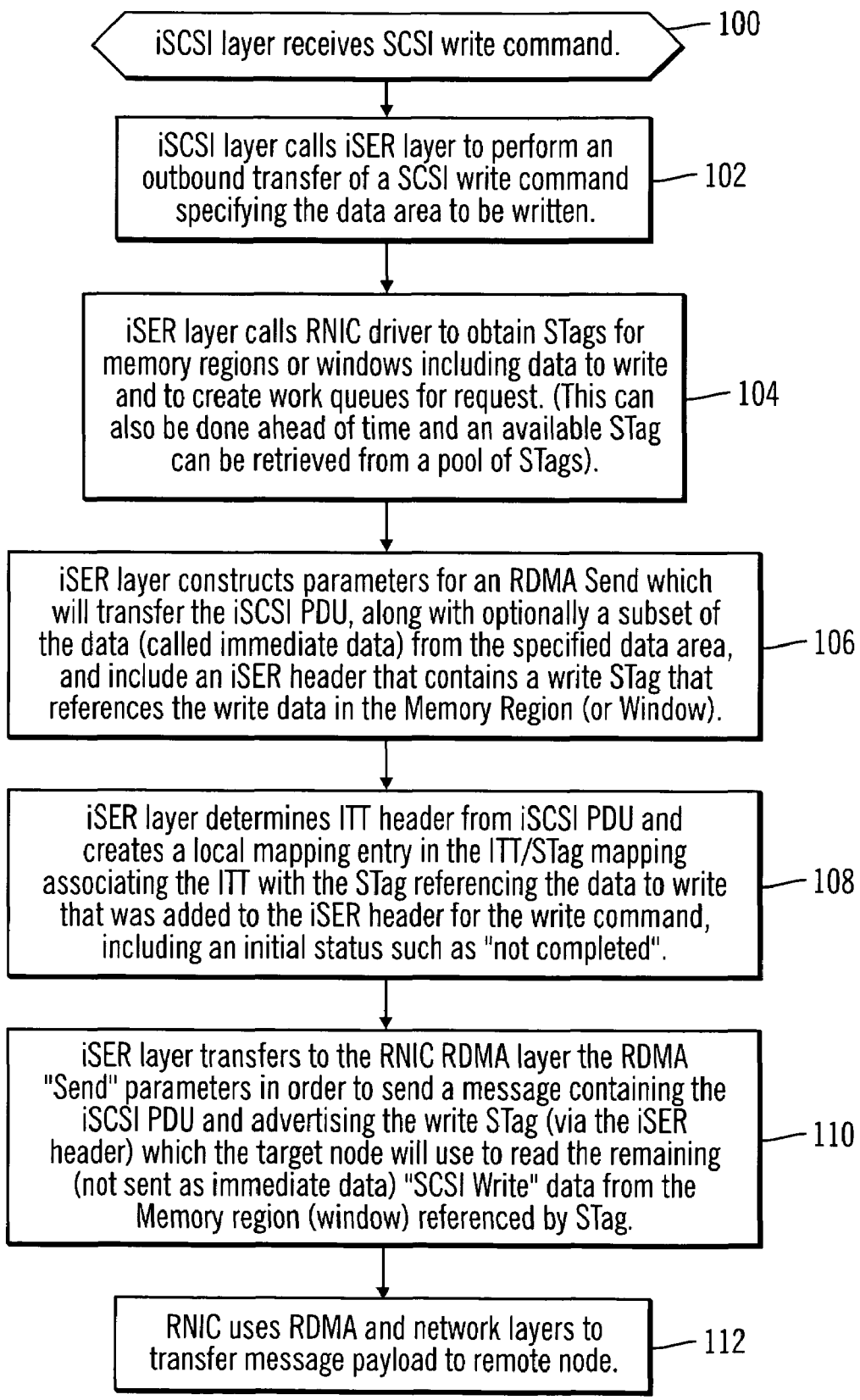
FIGS. 5, 6, 7, 8, and 9 illustrate operations performed to transfer data in accordance with embodiments.
Figure 6:
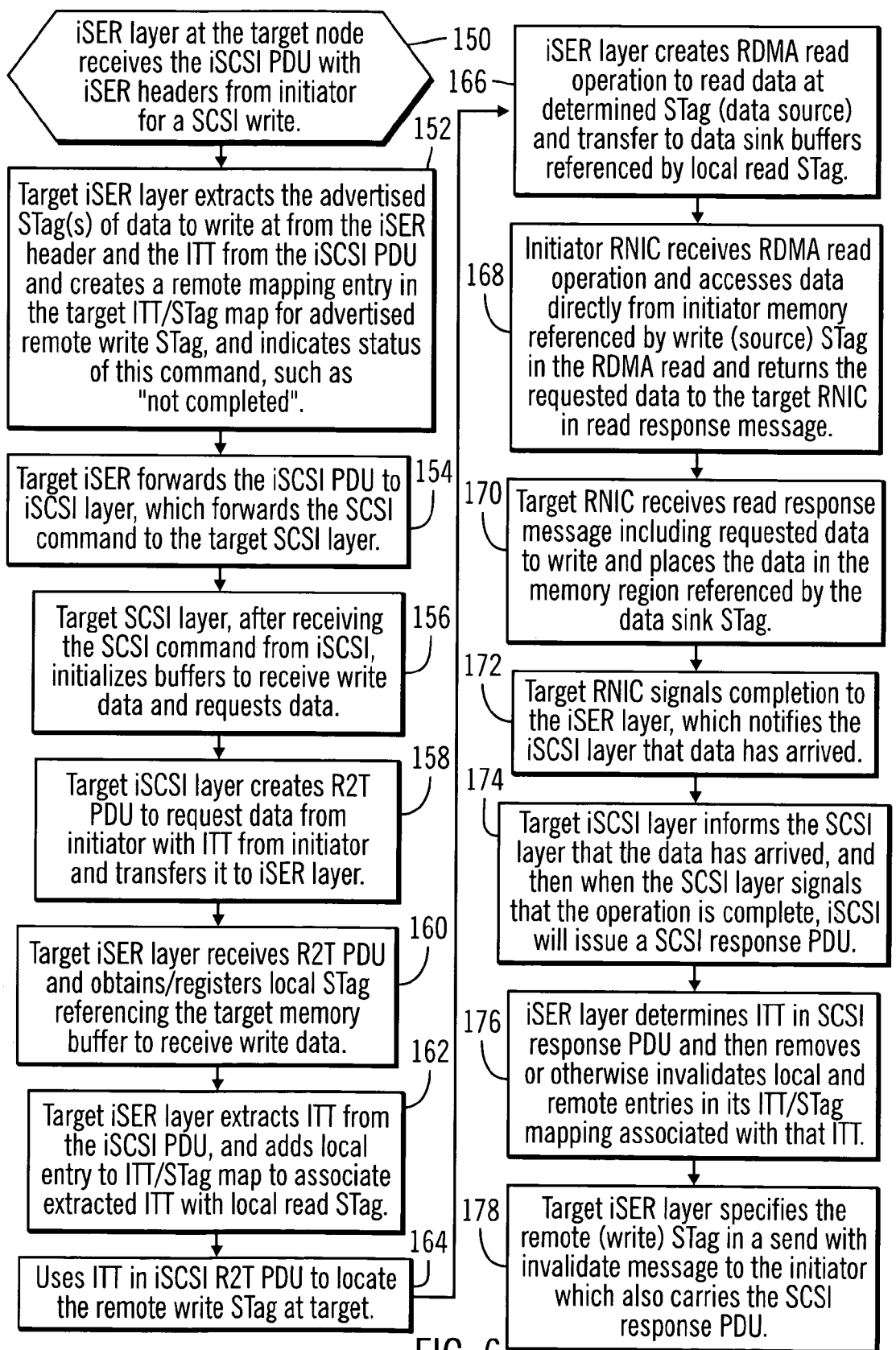
Figure 7:
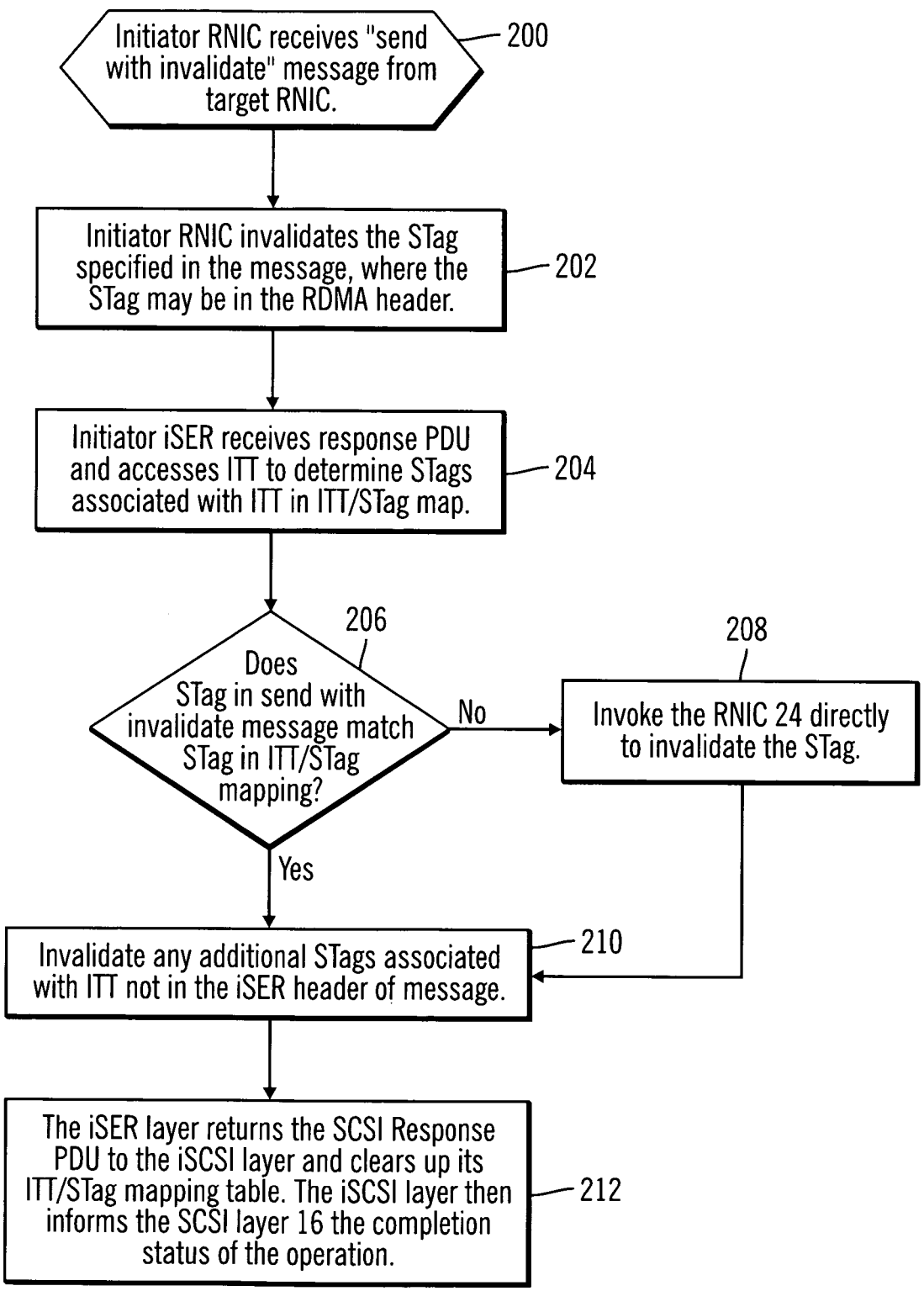

FIGS. 5, 6, and 7 illustrate operations to process a SCSI write command in accordance with described embodiments. With respect to FIG. 5, in response to receiving (at block 100) a SCSI write command, the iSCSI layer 18 calls (at block 102) the iSER layer 20 to perform an outbound transfer of the SCSI write command specifying the data area to be written. The iSER layer 20 then calls (at block 104) the RNIC driver 22 to obtain STags for memory regions or windows including the data to write and to create work queues for the request. (This can also be done ahead of time and an available STag can be retrieved from a pool of STags) The iSER layer 20 further constructs (at block 106) parameters for an RDMA Send which will transfer the iSCSI PDU, along with optionally a subset of the data (called immediate data) from the specified data area, and include an iSER header that contains a write STag that references the write data in the memory region 32 (or memory window). The initiator iSER layer 20 determines (at block 108) the ITT 56 from the iSCSI PDU 52 (FIG. 3) and creates a local mapping entry 72 (FIG. 4) in the ITT/STag mapping associating the determined ITT with the write STag referencing the data to write from the initiator memory 30 along with initial status such as "not completed". The write STag is included in the iSER header 54. The iSER layer 20 transfers (at block 110) to the RNIC RDMA layer 26 RDMA "Send" parameters in order to send a message containing the iSCSI PDU 52 and advertising the write STag (via the iSER header 54) which the target node will use to read the remaining (not sent as immediate data) "SCSI Write" data from the Memory region (window) referenced by STag. The initiator RNIC 24 uses (at block 112) the RDMA layer 26 and network layers 28 to transfer the message payload to the remote target node.

With respect to FIG. 6 illustrating the target node operations, the iSER layer 20 at the target node receives (at block 150) the iSCSI PDU 52 with iSER headers 54 from the initiator for a SCSI write 50. The architecture described with respect to FIG. 2 is used to describe the components within both initiator and target nodes. The target iSER layer 20 extracts (at block 152) the advertised write STag(s) from the iSER header 54 and the ITT 56 from the iSCSI PDU 52 and creates a remote mapping entry 72 (FIG. 4) in the target ITT/STag map 70 associating the advertised remote write STag with the ITT, and indicates status of this command, such as "not completed". The target iSER layer 20 forwards (at block 154) the iSCSI PDU 52, stripped of the iSER headers 54, to the iSCSI layer 18, which sends the SCSI command 50 to the SCSI layer 16. The target SCSI layer 16, upon receiving the SCSI command 50 from the iSCSI layer 18, initializes (at block 156) buffers in memory 30 to receive the initiator write data and requests the write data when ready to receive the data. The target iSCSI layer 18, in response to receiving the ready to transfer signal from the SCSI layer 16, creates (at block 158) a return ready to transfer (R2T) PDU to request data from the initiator with the ITT from the initiator and transfers the R2T PDU to the iSER layer 20. The iSER layer 20 receives (at block 160) the R2T PDU from the iSCSI layer 18 and obtains/registers from the target RNIC RDMA layer 26, via the RNIC driver 22, a local STag referencing a target device's memory buffer, such as a memory region or window, to receive the write data from the initiator. This local target STag would be a read STag referencing the target device's buffers into which the initiator write data is transferred.

The iSER layer 20 further extracts (at block 162) the ITT 56 from the iSCSI R2T PDU, and adds an entry 72 (FIG. 4) to the ITT/STag map 70 to associate the extracted ITT with the local read STag, which would be a local 72 entry. At this point, the target ITT/STag map 70 includes two entries to associate the ITT with the local (read) and remote (write) STags used for the write operation. The target iSER layer 20 uses (at block 164) the ITT 56 extracted from the iSCSI R2T PDU to locate the remote write STag from the entry added to the target ITT/STag map 70 at 152. The iSER layer 20 creates (at block 166) an RDMA read operation to read data specified by the remote (write) STag (data source) and transfer to data sink buffers referenced by the local (read) STag. This RDMA read operation is then transferred to the target RNIC 24 to execute.

Upon receiving (at block 168) the RDMA read operation, the initiator RNIC 24, through the RDMA layer 26, accesses the write data directly from the initiator's memory using the source (write) STag and returns the requested data to the target RNIC in an RDMA read response message. The target RNIC receives (at block 170) the RDMA read response message including requested write data and places the data in the target memory region referenced by the data sink (target local read) STag. The target RNIC 24 signals (at block 172) completion to the target iSER layer 20, which notifies the target iSCSI layer 18. The target iSCSI layer 18 informs the target SCSI layer 16 that the data has arrived, and then when the SCSI layer 16 signals that the operation is complete, the iSCSI 18 will issue (at block 174) a SCSI response PDU including the same ITT 56 used throughout the transaction. The iSER layer 20 receives the SCSI response PDU and determines (at block 176) the ITT 56 in the SCSI response PDU and then removes or otherwise invalidates local and remote entries 72 (FIG. 4) in its ITT/STag mapping 70 associated with that ITT, which would be the entries including the remote (write) STag and local (read) STag used for the write operation. The iSER layer 20 includes (at block 178) the remote (write) STag referencing the write data in the initiator memory 30 in a "send with invalidate" message to the initiator node which also caries the SCSI Response PDU 52.

FIG. 7 illustrates operations performed at the initiator upon receiving a "send with invalidate" message from the target. In response to receiving (at block 200) the "send with invalidate" message from the target RNIC 24, the initiator RDMA layer 26 invalidates (at block 202) the write STag referencing the write data in the initiator memory specified in the message, where the write STag may be in the RDMA header of the message. The initiator iSER layer 20 receives (at block 204) the SCSI response PDU and accesses the ITT 56 to determine the STags associated with ITT in the ITT/STag map 70. If (at block 206) the STag in the "send with invalidate" message does not match the STag in the entry 72 in the ITT/STag mapping 70 associated with the ITT included in the message, then the initiator iSER layer 20 ignores the error and invokes (at block 208) the RNIC 24 directly to invalidate the STag. Real errors may be caught in the protocol at another point. From block 208 or the yes branch of block 206 (if there is a match, i.e., the initiator RNIC invalidated the correct STag), then the initiator iSER layer 20 invalidates (at block 210) any additional STags associated with ITT not in the iSER header of the "send with invalidate" message. If both a read and a write STag were advertised earlier (for a bidirectional command), then the initiator iSER Layer invalidates the write STag upon receiving the "send with invalidate" message because in certain implementations the RDMA header of the send with invalidate" may only carry one STag (in this case the Read STag) to be invalidated. The iSER layer 20 (at block 212) returns the SCSI Response PDU 52 to the iSCSI layer and clears up its ITT/STag mapping table. The iSCSI layer 18 then informs the SCSI layer 16 the completion status of the operation.

Figure 8:
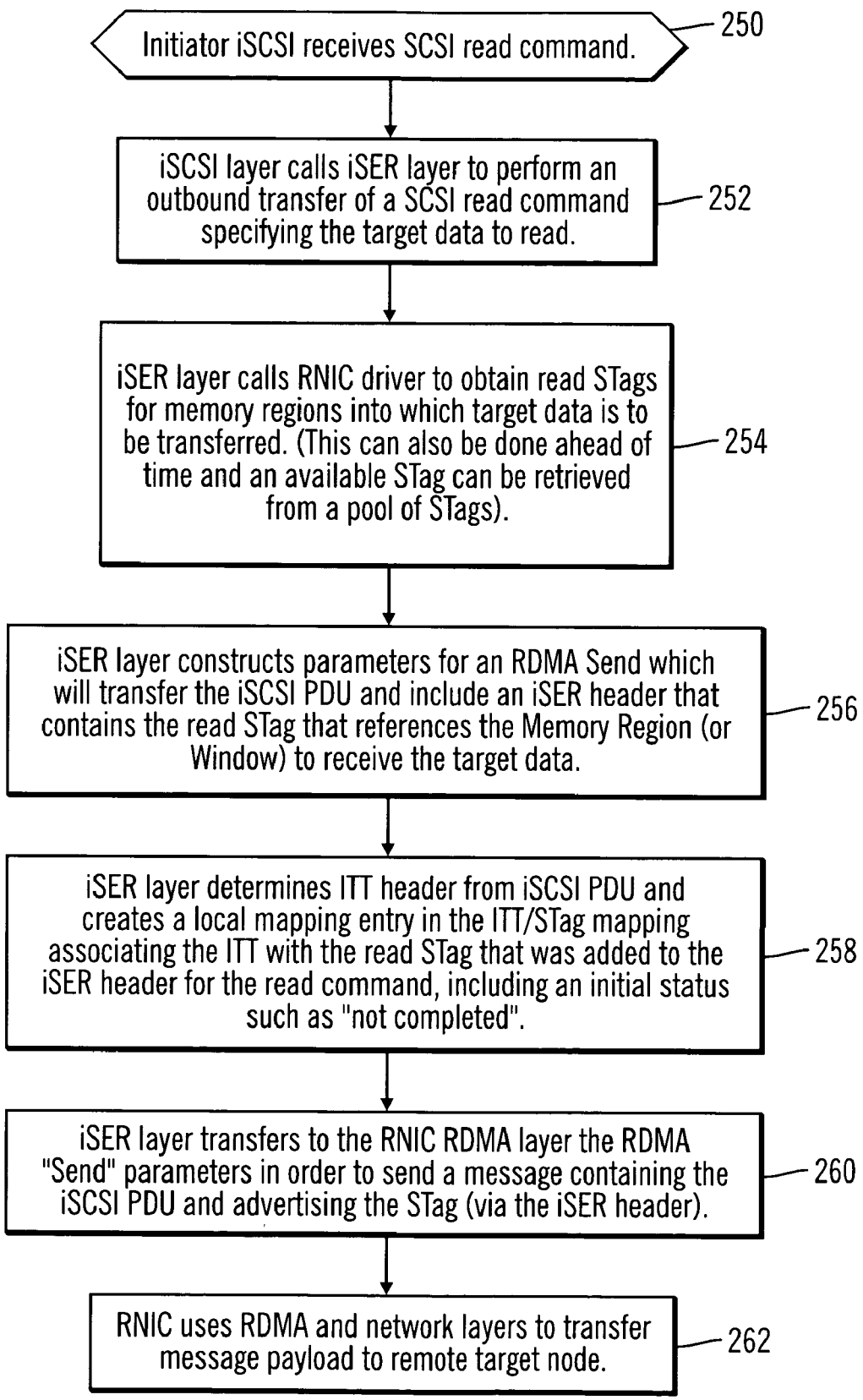
Figure 9:
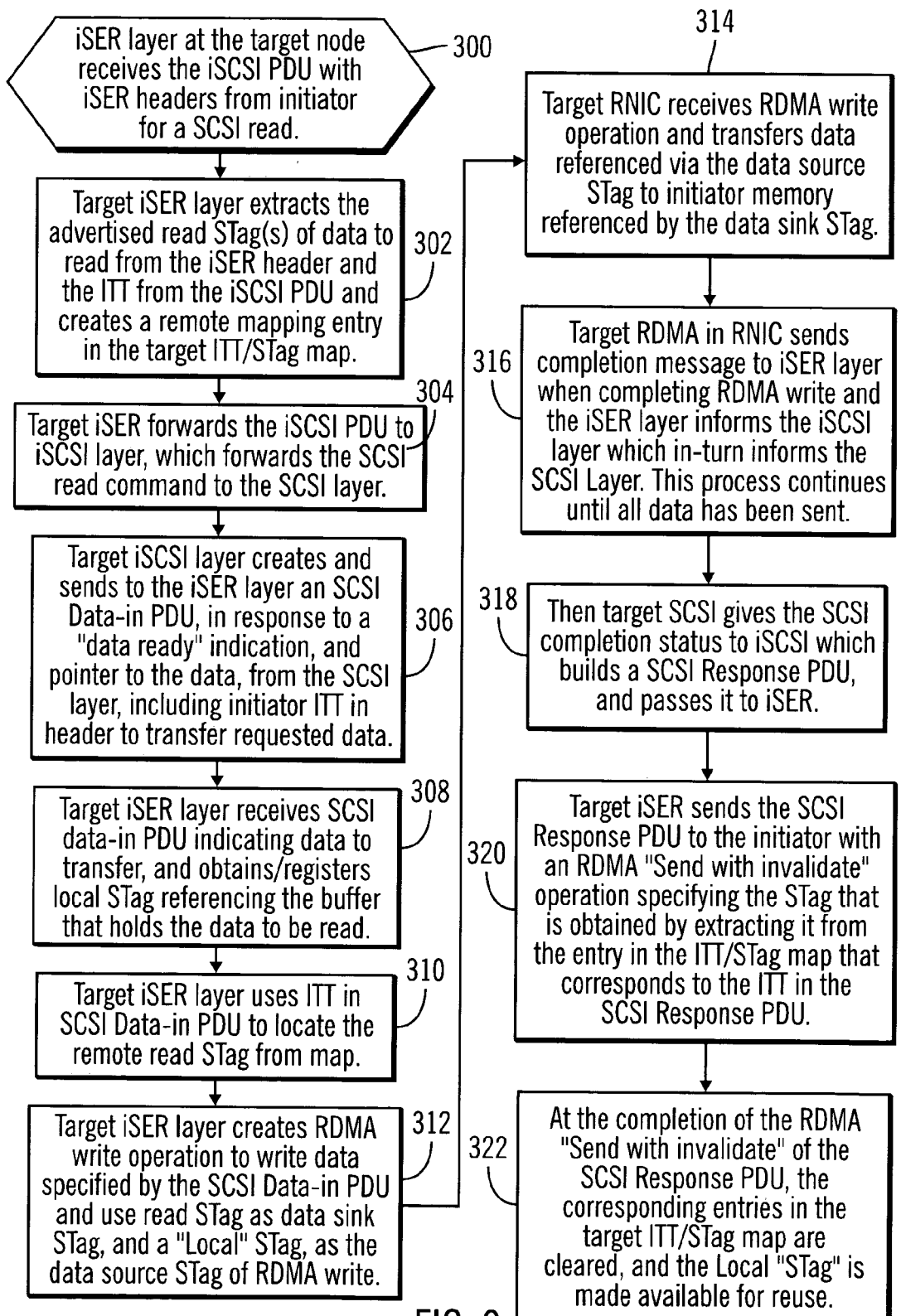

FIGS. 8 and 9 illustrate operations performed to process a read command. In response to the iSCSI layer 18 receiving (at block 250) a SCSI read command PDU, the iSCSI layer 18 calls (at block 252) the initiator iSER layer 20 to perform an outbound transfer of a SCSI read command specifying the target device's data to read. The initiator iSER layer 20 calls (at block 254) the RNIC driver 22 to obtain read STags for memory regions into which target data is transferred. (This can also be done ahead of time and an available STag can be retrieved from a pool of STags) The iSER layer 20 constructs (at block 256) parameters for an RDMA Send which will transfer the SCSI read PDU 52 and include an iSER header 54 that contains the read STag that references the initiator memory region 32 (or window) to receive the target data. The iSER layer 20 determines (at block 258) the ITT 56 from the iSCSI PDU 52 and creates a local mapping entry 72 (FIG. 4) in the ITT/STag map 70 associating the ITT created by the initiator iSCSI layer 18 with the read STag that was added to the iSER header 54, including an initial status such as "not completed". The iSER layer 20 transfers (at block 260) to the RNIC RDMA layer 26 the RDMA "Send" parameters in order to send a message containing the iSCSI PDU and advertising the read STag (via the iSER header 54). The RNIC 24 uses (at block 262) the RDMA layer 26 and network layers 28 to transfer the message payload to the remote target node.

With respect to FIG. 9 describing the read operations at the target node, the target iSER layer 20 receives (at block 300) the iSCSI PDU 52 with the iSER headers 54 from the initiator for the SCSI read. The target iSER layer 20 extracts (at block 302) the advertised read STag(s) of data to read from the iSER header 54 and the ITT 56 from the iSCSI PDU 52 and creates a remote mapping entry 72 in the target ITT/STag map 70 associating the extracted read STag and ITT. The target iSER layer 20 forwards (at block 304) the iSCSI PDU 52 to the iSCSI layer 18. The iSCSI layer 18 forwards the SCSI read command 50 to the SCSI layer 16, which would then ready the data for transfer in SCSI Data-in PDUs. The target iSCSI layer 18 creates and sends to the iSER layer 20 (at block 306) an iSCSI Data-in PDU, in response to a "data ready" indication, and pointer to the data, from the SCSI layer, including the initiator ITT 56 in the iSCSI PDU 52 to transfer the requested data.

The target iSER layer 20 receives (at block 308) the iSCSI data-in PDU indicating the data to transfer. The iSER layer 20 obtains/registers a local STag that references the local buffer which holds the "read" data to be sent to the initiator. iSER 20 creates a mapping entry 72 in the targets ITT/STag mapping 70 associating the ITT to the local STag. The target iSER layer uses (at block 310) the ITT in the iSCSI Data-in PDU to locate the remote read STag from the ITT/STag map 70. The iSER layer 20 creates (at block 312) an RDMA write operation to write data specified by the iSCSI Data-in PDU and uses the "Remote" (read) STag as a data sink STag of the RDMA write, and a "Local" STag, obtained from the RNIC 24, as the data source STag to reference the Data specified by the iSCSI Data-in PDU. The target RNIC 22 receives (at block 314) the RDMA write operation and transfers the received data to the memory in the initiator referenced by the data sink STag.

The target RDMA layer 26 in the RNIC 24 sends (at block 316) a completion message to the iSER layer 20 when completing the RDMA write. The iSER layer which in-turn informs the iSCSI layer about the completion of the data transfer, and the iSCSI layer in turn informs the SCSI layer. This process continues until all the data transfers have been completed. Then (in block 318) the target iSCSI layer indicates to the target iSCSI layer that all the data has been transferred, and gives the iSCSI layer the SCSI completion codes. The iSCSI layer builds an appropriate SCSI Response PDU including the appropriate status and ITT. The iSCSI layer passes the SCSI Response PDU to the iSER layer 20 which (in block 320) issues RDMA "Send with invalidate" message, which includes the remote STag which iSER retrieved, by using the ITT in the iSCSI response PDU, from the entry 72 in the target ITT/STag map 70. (This is the same remote STag used in the RDMA writes that transferred the data.) At the completion of the send (at block 322), the entries 72 in the target ITT/STag map 70 are cleared, and the Local "STag" is made available for reuse. Upon receiving the "send with invalidate" message, the initiator would perform the operations described with respect to FIG. 7 to handle the "send with invalidate" message.

In the described operations, the iSCSI layer 18 called the iSER layer 20. In alternative embodiments, other layers, such as the SCSI layer 16 or application 14, may build their own iSCSI PDUs and call the iSER layer 20 to implement SCSI read and write requests through RDMA calls made through the iSER library 20.

Additional Embodiment Details

The embodiments described herein may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The described operations may be performed by circuitry, where "circuitry" refers to either hardware or software or a combination thereof. The circuitry for performing the operations of the described embodiments may comprise a hardware device, such as an integrated circuit chip, Programmable Gate Array (PGA), Application Specific Integrated Circuit (ASIC), etc. The circuitry may also comprise a processor component, such as an integrated circuit, and code in a computer readable medium, such as memory, wherein the code is executed by the processor to perform the operations of the described embodiments.

In the described embodiments, the RNIC 24 transferred RDMA messages within a TCP/IP packet. The described embodiments are applicable to implementations using RDMA over TCP/IP or other network protocols, such as RDMA over Infiniband, CI (cLan, Servernet, etc.), Stream Control Transmission Protocol ("SCTP"), etc.

In the described implementations, the physical layer utilized the Ethernet protocol. In alternative implementations, alternative protocols providing link-to-link checksumming/CRCs (or other data detecting schemes) of the packet may be used instead of Ethernet, such as Serial Advanced Technology Attachment (SATA), Infiniband, serial attached SCSI cable, etc.

In described implementations, the transport layer comprised the iSCSI protocol. In alternative implementations other protocols known in the art for transmitting I/O commands in packets and providing end-to-end checksumming/CRCs (or other data detecting schemes) may be used.

In the described implementations, the packaged I/O commands comprised SCSI commands. In alternative implementations, the commands may be in different I/O command formats than SCSI, such as Advanced Technology Attachment (ATA).

In described embodiments, the iSCSI layer made calls to the iSER layer to access the RDMA data transfer capabilities. In additional embodiments, data transfer protocol layers other than iSCSI, such as an application or other data transfer protocols, may call the iSER layer to access RDMA data transfer capabilities.

FIGS. 5, 6, 7, 8, and 9 describe specific operations occurring in a particular order. In alternative implementations, certain operations may be performed in a different order, modified or removed. Moreover, steps may be added to the above described logic and still conform to the described implementations. Further, operations described herein may occur sequentially or certain operations may be processed in parallel. Yet further, operations may be performed by a single processing unit or by distributed processing units.

The foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for transferring data, comprising:

receiving a request comprising a write request conforming to a first data transfer protocol at an initiator node to transmit to a target node, wherein the request includes a request identifier in the first data transfer protocol;

obtaining a reference to a memory location to use for the request using a second data transfer protocol, wherein the reference is used by the second data transfer protocol;

adding an entry to an initiator map associating the reference to the memory location for the second data transfer protocol with the request identifier for the first data transfer protocol, wherein the map includes two entries associated with the request identifier, one write reference identifying initiator memory at the initiator node including the data to write and one read reference identifying target memory at the target node into which the data to write is transferred at the target; and transferring, using the second data transfer protocol, the request with the request identifier and the reference to the memory location;

receiving an invalidate message in the second data transfer protocol from the target node including one reference in the second data transfer protocol and the request identifier in the first data transfer protocol;

invalidating, with adaptor hardware in the initiator node, the reference in the invalidate message;

determining, with an adaptor driver in the initiator node, from the map the write and read references associated with the request identifier in the invalidate message;

determining, with the adaptor driver, whether the invalidated reference in the invalidate message matches one reference in the determined write and read references from the map;

invalidating, with the adaptor driver, one reference in the initiator map, and ignoring the error condition when the invalidated reference does not match one of the write and read references; and invalidating the reference in one of the two determined entries not included in the invalidate message.

2. The method of claim 1, wherein the request originates at the initiator node and comprises a write command to write data from the initiator node to the target node to which the request is transferred using the second data transfer protocol, and wherein the reference comprises a write reference identifying initiator memory at the initiator node including the data to write to the target node.

3. The method of claim 2, wherein the map comprises an initiator map at the initiator node, further comprising:

receiving, at the target node, the request transferred using the second data transfer protocol, with the request identifier and the write reference;

adding an entry to a target map at the target node associating the write reference with the request identifier.

4. The method of claim 3, further comprising:

obtaining a read reference to a target memory location at the target node to receive the write data in the second data transfer protocol;

adding an entry to the target map associating the read reference with the request identifier; and generating, at the target node, a read request in the second data transfer protocol specifying to transfer the data in the initiator memory referenced by the write reference to the target memory referenced by the read reference, wherein the target node transfers the read request to the initiator.

5. The method of claim 2, further comprising:

receiving an invalidate message in the second data transfer protocol from the target node including one reference in the second data transfer protocol and the request identifier in the first data transfer protocol; and invalidating the read or write reference not included in the invalidated message.

6. The method of claim 1, wherein the target node invalidates the references in the target node map related by the identifier in the first data transfer protocol.

7. The method of claim 1, wherein the request comprises a SCSI I/O command, wherein the first data transfer protocol comprises iSCSI, wherein the second data transfer protocol comprises RDMA, and wherein an iSER layer performs the operations of obtaining the reference to the memory location and adding the entry to the map.

* * * * *